Jan. 28, 1958 E. P. THIAS 2,821,623

END-LOADED LONG-LINE SUPERHETERODYNE
TUNER HAVING TRACKING MEANS
Filed Jan. 20, 1954

INVENTOR.
EDWIN P. THIAS

BY

Ostrolenk and Faber
ATTORNEY.

United States Patent Office 2,821,623

Patented Jan. 28, 1958

2,821,623

END-LOADED LONG-LINE SUPERHETERODYNE TUNER HAVING TRACKING MEANS

Edwin P. Thias, Los Angeles, Calif., assignor to Standard Coil Products Co., Inc., Los Angeles, Calif., a corporation of Illinois Application January 20, 1954, Serial No. 405,133

2 Claims. (Cl. 250—20)

The present invention relates to a television tuner and more particularly it relates to a continuous tuner for operation at ultra-high frequencies.

Continuous tuners for operation at V. H. F. or U. H. F. rely usually on variable length transmission lines or on variable capacitors for tuning in these television frequency ranges.

When capacitors are used as the trimming or variable element, at the relatively lower V. H. F. frequencies the other tuning component is generally an inductor, while at U. H. F. the second tuning element may be a transmission line since at U. H. F. lumped inductors present a relatively low Q while a transmission line presents relatively high Q in this frequency range.

Previous continuous tuners for operation at U. H. F. have some cases utilized portions of the transmission line element as the stator plates of a varable capacitor.

In such cases it has always been found necessary to bend the rotor plates of the variable capacitor to ensure proper tracking between the various tuned circuits which in the case of a U. H. F. tuner may be the two tuned circuits of a preselector and the third tuned circuit for the oscillator.

In order to easily bend the rotor plates of these variable capacitors it has been found necessary to knife the rotor plates.

It should be noted at this point that especially at ultra-high frequencies it is difficult to provide the necessary tracking by changing the configuration of the second tuning element, namely, the inductor or transmission line. This was due generally to the particular shape of the transmission line used. For example, if the transmission line consists of an inner U-shaped conductor and an outer rectangularly shaped conductor, it is difficult to modify the shape of the inner conductor to provide the necessary tracking. This makes imperative the knifing and bending of the other electrical component of the tuned circuit, namely, of the rotor plates of the tuning capacitor unless the transmission line itself is changed.

One object of the present invention is, therefore, the provision of means for obtaining the correct tracking by modifying the transmission line element of a tuned circuit.

More specifically, by varying the physical shape of the rotor plates of the tuning capacitor, one could control the maximum capacity of this capacitor, but varying the shape of the rotor plates meant, of course, knifing and bending the plates. In the present invention, on the other hand, the above results are obtained by varying the relative positions of the stationary plates.

Another object of the present invention is the provision of means for controlling the capacitance of variable capacitors without changing the shape of their rotor plates.

The same problem exists also when instead of using a portion of the transmission line as the stator plates of a variable capacitor, stator plate structures are secured at the end of a transmission line to form together with appropriate rotor plates a variable capacitor connected at the end of the transmission line.

In this second case too in order to obtain good tracking the rotor plates were knifed and bent after assembly of the tuner, while the stator elements or the transmission line to which they are connected were not altered because of the inherent construction of the stator plates.

Accordingly, another object of the present invention is the provision of variable capacitors for end tuning a transmission line wherein proper tracking with other tuned circuits is obtained without any change in shape of the rotor plates of the tuning capacitor.

Furthermore, to obtain good tracking, it is found necessary to vary also the minimum capacitance to which the variable capacitor can be used so as to control and similarly vary the upper frequency of operation of the tuned circuit.

Another object of the present invention is, therefore, the provision of means for varying the minimum capacity of a variable capacitor operating as a tuning element in a U. H. F. tuned circuit.

Another object of the present invention is the provision of means for easily assembling television tuners operable in the television U. H. F. range.

In the present invention a continuous tuner consists of two end tuned co-axial lines for R. F. selection and one balanced or parallel wire line also end tuned as the main resonance element for an oscillator operating at U. H. F.

The inner conductor of the two R. F. lines consists of two flat parallel bands with a spacing bar positioned for a portion of the length of the blades so that the blades have extensions which are used as stator plates of a variable capacitor, the rotor plate of which rotates in between the two blade extensions.

One of the novel features of this invention is the provision that the two free blade ends can be moved relative to each other or, in other words, their separation and their relative distance with respect to the rotor plates can be varied, such a variation causing a change in the capacity of this capacitor.

In the parallel wire line tuned circuit stator plate structures are mounted at each end to each parallel structure so that rotor plates assemblies may move between the stator plates and provide the necessary capacitance variation.

Another feature of this invention resides in making one of the stator plates slightly movable and biased, for example, in a given direction so that by the use of a screw moving in a direction opposite to that of the bias, the position of these outer plates can be varied with respect to the rotor plates and with respect to the other stator plates to thus vary slightly but by the desired amount the maximum capacitance of these capacitors.

In order to vary the minimum capacitance of the R. F. variable capacitors, a metallic member, for example a leaf spring, is attached adjacent the free ends of the inner conductor of the R. F. lines, that is, adjacent to the stator plates of the R. F. tuning capacitors. The leaf spring is so positioned that its motion with respect to the stator plates will vary the minimum capacitance of these R. F. capacitors, this motion and the subsequent positioning being determined by appropriate positioning means, for example a screw, engaging the chassis on which these tuning elements are mounted and bearing against one side of the flat leaf spring.

By such means then it is possible to assemble and track U. H. F. tuners of the continuous type.

The foregoing and many other objects of the invention will become apparent in the following description and drawings in which.

Figure 1:
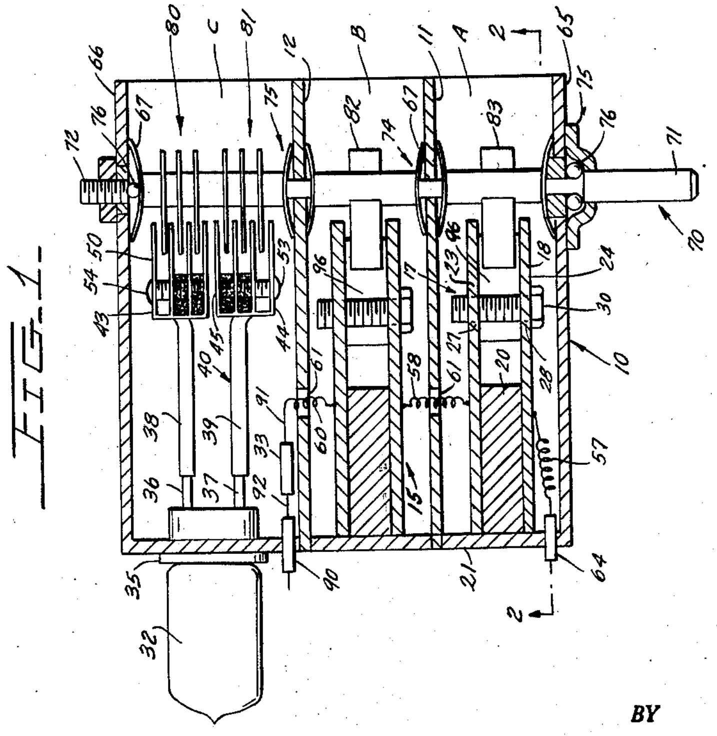
Figure 1 is a plan view of the tuner of the present invention showing the means for varying the maximum capacitance of the tuning capacitors for obtaining good tracking.

Referring first to Figure 1, the tuner of the present invention consists of a chassis 10 of rectangular shape divided into three sections called A, B, and C by two shields or partitions 11 and 12. Partitions 11 and 12 shield completely one section from the contiguous one except for certain components in the shields 11 and 12 as described hereinafter.

Sections A and B are essentially alike and are provided in their interior with conductive structures 14 and 15, respectively. Since sections A and B are practically alike, section A will be described in detail, the differences between the two sections being pointed out hereinafter.

Section A has in its interior the conductive structure 14 which forms with the other components mounted in its interior the first R. F. tuned circuit for the television tuner. The conductor structure 14 is the inner conductor of what may be called a coaxial system, the outer conductor being formed by a portion of the walls of chassis 10 and shield 11.

Conductor structure 14 consists of metallic blades 17 and 18 of flat shape positioned parallel to each other so that they face each other on one of their flat sides. This is seen more clearly, for example, in Figure 2 or the detail of Figure 3.

Spacer bar 20 is positioned between the two blades 17 and 18 at one end and more precisely at the end at which the blades 17 and 18 are secured in electrical engagement with side wall 21 of chassis 10. Blades 17 and 18 are free on the other side, namely at the ends 22, 23 and 24, and are provided close to this end with aligned threaded openings 27 and 28, respectively, to be engaged by a screw 30.

Conductor structure 15 of section B is of similar shape and is mounted in parallel relation with respect to conductor structure 14. Section B with elements mounted in its interior, some of which will be described hereinafter, has a second R. F. tuned circuit for the present tuner and operates between the same frequency limits of the R. F. tuned circuit of section A.

The third section C of this tuner contains the tuning element of oscillator tube 32, for example, a 6A4 or 6T4 and the mixer circuit consisting of crystal mixer 33. Tube 32 is mounted on wall 21 of chassis 10 through a tube socket 35 mounted on wall 21 in any suitable way in a manner now well-known in the art.

Connected to the appropriate pins 36 (grid) and 37 (plate) of socket 35 are the conductors 38 and 39 of the two-wire transmission line 40. Transmission line 40 with its conductors 38 and 39 constitutes because of its preselected length the inductive element of the tuned circuit of oscillator tube 32.

It should be mentioned that oscillator tube 32 is caused to operate at ultra-high frequencies and that all the circuitry that is well-known in the art necessary for the operation of tube 32 is not being shown. Only transmission line 40 because of its novel tuning elements was above described in detail.

Stator plate structures 42 and 43 are mounted, respectively, on the far ends of conductors 38 and 39 of transmission line 40 through insulation posts 47 secured to base 95 of chassis 10. Stator structures 43 and 44 are essentially alike consisting of plates such as 45 separated from each other by space 46. The last plate in each of the two structures 43 and 44, namely plates 50 and 51, are secured to structures 43 and 44, respectively, and biased away from the other plates 45; that is, plates 50 and 51 are flexibly attached to the stator assemblies 43 and 44, respectively, and they are formed so that their natural tendency is to spring away from the other plates 45 of assemblies 43 and 44, respectively.

Plates 50 and 51 are provided with openings aligned with respect to tapped holes in assemblies 43 and 44 and engageable by a screw 53 for stator assembly 44, and 54 for stator assembly 43. Rotation of screws 53 and 54 determines the relative position of the end plates 51 and 50 with respect to the other plates 45 of assemblies 44 and 43 and as will be seen hereinafter the two screws 53 and 54 also determine the position of the end plates 51 and 50 with respect to the rotor plates mounted on a shaft.

Television signals are introduced in the present tuner from an antenna (not shown) through a line 56 leading to a choke 57 connected to a tap of a conductive structure 14 of section A. Conductor structure 14 in section A is coupled to the conductive structure 15 of section B through a second choke 58 and conductive structure 15 of section B is connected to crystal mixer 33 of section C through a third choke 60 where chokes 58 and 60 pass through an appropriate opening 61 and 62, respectively, in shields 11 and 12.

Transmission line 56 is connected to choke 57 which is in the interior of section A through an opening 64 in a wall, for example wall 21 of chassis 10. The front wall 65, back wall 66 of chassis 10 and shields 11 and 12 are each provided with an appropriate opening 67 in which is mounted for rotation a shaft 70. Shaft 70 extends from the front wall 65 of the tuner to back wall 66. Shaft 70 actually extends beyond the front wall 65 and the back wall 66 at its extensions 71 and 72.

Front wall 65 is provided around opening 67 with a bearing holder member 75 mounted on front wall 65 in alignment with the opening 67. Holder 75 serves to hold a series of ball bearings 76 engaging shaft 70. The other end of shaft 70 is similarly provided with bearings 78 as shown in the figure.

At each opening 67 shaft 70 is also engaged by conductive leaf spring means 72, 74, 75 and 76 which engage appropriate slots (not shown) in shaft 70 so as not to permit axial movement of shaft 70 with respect to chassis 10. Mounted on shaft 70 are the rotor plates, in this case a rotor plate structure 80 consisting of three rotor plates rigidly secured to shaft 70 which serve to vary the capacitance of the stator structure 43. The second set of rotors 81 serve to similarly vary the capacitance of stator structure 44.

While these rotor plates 80 and 81 are mounted in section C, a single rotor plate 82 is mounted on shaft 70 in section B for varying the capacitance between the free plate ends 17 and 18 of conducting element 15 of a transmission line. A similar rotor plate 83 varies the capacity between the free plate ends 17 and 18 of conductive section 14 of section A.

Up to now it has always been found difficult but necessary to vary the high capacitance value of the capacitors thus constructed by bending or knifing or both the rotor plates 80, 81, 82 and 83. The problem arising here is due to the fact that the stator plate assemblies 43, 44, 14 and 15 may at the assembly line appear slightly different from the previous model sufficiently to effect the desired results.

This is overcome by using the stator plate structure of this invention described above.

After the mounting of shaft 70 and its rotor plates with respect to the stator plates 17 and 18 of conductive structures 14 and 15, respectively, screws 30 of the two R. F. sections A and B and screws 53 and 54 of the oscillator section C are adjusted so that plates 17 and 18 of the conductive sections 14 and 15 are moved with respect to each other and with respect to the rotor plates 83 and 82, respectively, for good tracking between the tuning elements of section A and those of section B at rotation of shaft 70.

At the oscillator section C rotation of screws 53 and 54 causes the relative motion of end plates 51 and 50, respectively, of the stator structures 44 and 43 with respect to the other stator plates 45 and rotor plates 81 and 80.

Thus, after the actual mounting operation of the present tuner simple individual adjustments at the R. F. and oscillator sections make possible the correct tracking or at least make possible the selection of the desired maximum capacity for the tuning capacitors used.

It was mentioned earlier that choke 60 connects the conductive structure 15 of R. F. section B to the crystal mixer 33 which in its turn is connected through a feed through capacitor 90 to an I. F. tuned circuit (not shown) and from there to the utilization circuits of a television receiver.

Crystal mixer 33 and its associated leads, namely lead 91 connecting choke 60 to crystal 33 and lead 92 connecting the output of crystal 33 to the feed through capacitor 90, are positioned in parallel relationship with respect to the two conductors 38, 39 of line 40 of oscillator section C and within section C so that the desired coupling relationship is obtained between the oscillator tuned circuits and the crystal mixer.

Figure 3:
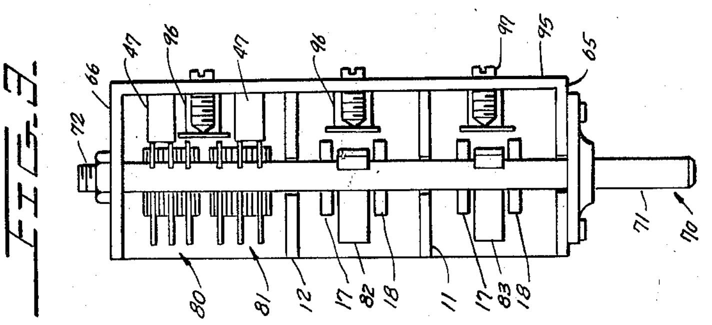
Figure 3 is another side view of the tuner of Figure 1 showing in detail the means for adjusting the minimum capacitance of the tuning capacitors.
Figure 2:
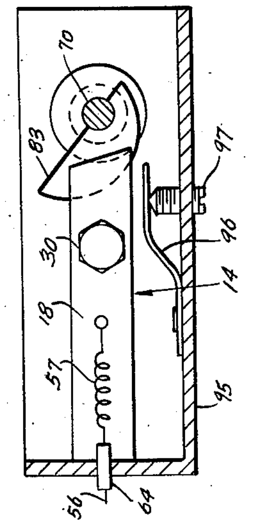
Figure 2 is a side view of the present tuner.

Referring now to Figures 2 and 3 showing the adjustment in the minimum capacity of the variable capacitors used in the present tuner, mounted on the base 95 of chassis 10 directly under the extensions 17 and 18 of conductive structures 14 and 15 of sections A and B and similarly under the stator structures 43 and 44 of section C are individual leaf springs 96 which are shaped so that they bear against a screw 97 engaging the base 95 of chassis 10 and protruding through base 95.

It is easily seen from Figures 2 and 3 that motion of screw 97 in what in these drawings is the vertical direction causes a corresponding motion of leaf spring 96 with respect to the two plate ends 17, 18 of sections A and B or structures 43 and 44 of section C so as to vary the minimum capacitance of these capacitors.

This, of course, is due to the fact that motion of leaf spring 96 with respect to the stator plates 17, 18, 43 and 44 causes a change in the electrical field distribution and a corresponding change, therefore, in the capacitance from ground to plates 17, 18, 43 and 44.

Thus, after having performed the first operation, namely the adjustment for maximum capacity, a second operation is required, that is the adjustment for minimum capacity which is performed by adjustment of screw 97. At the end of this adjustment the desired tracking will be obtained.

It is now possible to describe generally the operation of the tuner of the present invention.

U. H. F. signals are introduced in the tuner through choke 57 and a first selection occurs in section A where when shaft 70 is in the correct angular position, the correct capacity will be obtained between stator plates 17 and 18 and rotor plates 83, where by correct capacitance is here meant the capacitance that will cause the tuned circuit of section A to be tuned to the desired ultra-high frequency corresponding to the desired U. H. F. channel.

After this first selection, the signal is applied through choke 51 to the second R. F. tuned circuit in section B where a further selection takes place.

Finally, the desired signal still at the radio frequency is applied through a choke 60 to the crystal mixer 33. At the same time, since correct tracking is here assumed, the tuned circuit connected to oscillator 32 in section C is set to the desired local oscillator frequency so that the output from the oscillator tube 32 when coupled as shown in Figure 1 to the crystal mixer 33 will produce at the feed through capacitor 90 the desired intermediate frequency signal which can now be applied to I. F. amplifiers and other utilization circuits of television receivers.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. A U. H. F. continuous tuner comprising a preselector for selecting incoming U. H. F. signals, said preselector comprising a pair of transmission lines each terminated with capacitor loading, a source of heterodyning signals comprising an electron tube and a pair of conductors terminated with a capacitor load, one of said conductors being connected to the grid of said tube, the other of said conductors being connected to the plate of said tube, a converter for converting the frequency of the incoming U. H. F. signals to a fixed frequency, means for inductively coupling said preselector and said heterodyning source to said converter, the capacitors loading said lines and said conductors comprising stator plates and rotor plates, a shaft for mounting said rotor plates for simultaneous operation, means for adjusting the spacing between the stator plates of each of said capacitors to determine the maximum capacity of said capacitors and correspondingly the lowest frequency of operation of said tuner, said means comprising an individual screw engaging stator plates of each of said loading capacitors, means for adjusting the minimum capacitance of said capacitors and controlling the upper frequency of operation of said tuner, said last-mentioned means comprising a leaf spring mounted in proximity to the stator plates of each of said capacitors, said leaf springs being connected to chassis ground, a screw for varying the separation between each of said leaf springs and its corresponding set of stator plates, the free unloaded ends of each of said transmission lines being secured in electrical and mechanical connection with the tuner chassis.

2. In a U. H. F. continuous tuner, a preselector for selecting incoming U. H. F. signals, said preselector comprising a pair of transmission lines terminated with a capacitor load, each of said loaded lines comprising two parallel conductors having their unloaded ends connected to chassis ground, a spacer bar being intermediate to said conductors providing the necessary spacing between the said two conductors, said spacer bar extending from the grounded end of said conductors for a limited length less than the length of said conductors, a screw engaging the free ends of said conductors for varying the separation at the said free ends, said free ends constituting the stator plates of said loading capacitors, an operating shaft, a rotor plate mounted on said shaft for each of said two loading capacitors, said screw determining the lowest frequency of operation of said preselector, a leaf spring connected to ground and mounted in proximity to the free ends of each of said lines, means for positioning said leaf springs with respect to said lines and capacitors to determine the highest frequency of operation of said tuner.

References Cited in the file of this patent

UNITED STATES PATENTS

| | | |
|---|---|---|
| 1,743,019 | Barone et al. | Jan. 7, 1930 |
| 2,223,835 | Smith | Dec. 3, 1940 |
| 2,277,638 | George | Mar. 24, 1942 |
| 2,398,721 | Rogers et al. | Apr. 16, 1946 |
| 2,408,895 | Turner | Oct. 8, 1946 |
| 2,501,671 | Gangel | Mar. 28, 1950 |
| 2,601,445 | Murakami | June 24, 1952 |

FOREIGN PATENTS

| | | |
|---|---|---|
| 334,996 | Great Britain | Sept. 18, 1930 |